United States Patent
Kuo et al.

(10) Patent No.: US 11,263,785 B2
(45) Date of Patent: Mar. 1, 2022

(54) OBJECT DETECTION METHOD, ELECTRONIC APPARATUS AND OBJECT DETECTION SYSTEM

(71) Applicant: Wistron Corporation, New Taipei (TW)

(72) Inventors: Shih-Hao Kuo, New Taipei (TW); Hao-Gong Chou, New Taipei (TW); Tai Chung, New Taipei (TW)

(73) Assignee: Wistron Corporation, New Taipei (TW)

( * ) Notice: Subject to any disclaimer, the term of this patent is extended or adjusted under 35 U.S.C. 154(b) by 60 days.

(21) Appl. No.: 16/794,144

(22) Filed: Feb. 18, 2020

(65) Prior Publication Data
US 2021/0150764 A1 May 20, 2021

(30) Foreign Application Priority Data
Nov. 14, 2019 (TW) ................ 108141335

(51) Int. Cl.
*G06T 7/00* (2017.01)
*G06T 7/73* (2017.01)
*G06K 9/00* (2022.01)
*G06N 3/04* (2006.01)

(52) U.S. Cl.
CPC ............ *G06T 7/97* (2017.01); *G06K 9/00744* (2013.01); *G06N 3/04* (2013.01); *G06T 7/74* (2017.01); *G06T 2207/10016* (2013.01); *G06T 2207/20081* (2013.01); *G06T 2207/20084* (2013.01)

(58) Field of Classification Search
CPC ... G06T 7/97; G06T 7/74; G06T 2207/10016; G06T 2207/20084; G06T 2207/20081; G06K 9/00744; G06N 3/04
See application file for complete search history.

(56) References Cited

U.S. PATENT DOCUMENTS

| | | | |
|---|---|---|---|
| 2019/0197679 A1 | 6/2019 | Fang et al. | |
| 2019/0252073 A1* | 8/2019 | Hsu | G06N 3/0454 |
| 2020/0380720 A1* | 12/2020 | Dixit | G06T 7/168 |
| 2021/0019872 A1* | 1/2021 | Kang | G06N 3/04 |
| 2021/0019910 A1* | 1/2021 | Huyn | G06K 9/00026 |
| 2021/0142177 A1* | 5/2021 | Mallya | G06N 3/04 |

FOREIGN PATENT DOCUMENTS

| | | |
|---|---|---|
| TW | I653605 | 3/2019 |
| TW | 201941217 | 10/2019 |

OTHER PUBLICATIONS

"Office Action of Taiwan Counterpart Application", dated Sep. 14, 2020, pp. 1-8.

* cited by examiner

*Primary Examiner* — Ping Y Hsieh
(74) *Attorney, Agent, or Firm* — JCIPRNET

(57) ABSTRACT

An object detection method, an electronic apparatus and an object detection system are provided. The method is adapted to the electronic apparatus and includes the following steps. A first image is obtained. A geometric transformation operation is performed on the first image to obtain at least one second image. The first image and the at least one second image are combined to generate a combination image. The combination image including the first image and the at least one second image is inputted into a trained deep learning model to detect a target object.

20 Claims, 7 Drawing Sheets

OBJECT DETECTION METHOD, ELECTRONIC APPARATUS AND OBJECT DETECTION SYSTEM

CROSS-REFERENCE TO RELATED APPLICATION

This application claims the priority benefit of Taiwan application no. 108141335, filed on Nov. 14, 2019. The entirety of the above-mentioned patent application is hereby incorporated by reference herein and made a part of this specification.

TECHNICAL FIELD

The disclosure relates to an object detection method, and more particularly, to an object detection method, an electronic apparatus and an object detection system using deep learning.

BACKGROUND

Deep learning is a technology that can be used to solve computer vision-related problems (e.g., an image classification and an object detection, but not limited thereto). Deep learning has commercial potential for applications such as autonomous driving, mobile devices, and artificial intelligent (AI) software applications. One of important applications in deep learning is the object detection based on images that can detect objects through a feature extraction and a feature classification. With the development of image surveillance, Internet of Things, and smart home, the object detection technology has gradually entered the market, improving the convenience of life.

SUMMARY

Accordingly, the disclosure proposes an object detection method and an electronic apparatus that can effectively improve accuracy of the deep learning model for detecting objects and avoid repeatedly training the deep learning model.

An embodiment of the disclosure provides an object detection method adapted to an electronic apparatus, and the method includes the following steps. A first image is obtained. A geometric transformation operation is performed on the first image to obtain at least one second image. The first image and the at least one second image are combined to generate a combination image. The combination image including the first image and the at least one second image is inputted into a trained deep learning model to detect a target object in the first image.

An embodiment of the disclosure provides an electronic apparatus that includes a storage device and a processor, and the processor is coupled to the storage device. The processor is configured to perform the following steps. A first image is obtained. A geometric transformation operation is performed on the first image to obtain at least one second image. The first image and the at least one second image are combined to generate a combination image. The combination image including the first image and the at least one second image is inputted into a trained deep learning model to detect a target object in the first image.

Based on the above, in the embodiments of the disclosure, the at least one second image is generated based on the geometric transformation operation performed on the first image, and the combination image includes the first image and the at least one second image. The target object can be detected by inputting the combination image into the trained deep learning model. In this way, detection accuracy of the deep learning model can be improved, so as to avoid the detection failure on the target object and repeatedly training the deep learning model.

To make the aforementioned more comprehensible, several embodiments accompanied with drawings are described in detail as follows.

DESCRIPTION OF THE EMBODIMENTS

Some embodiments of the disclosure are described in details below by reference with the accompanying drawings, and as for reference numbers cited in the following description, the same reference numbers in difference drawings are referring to the same or like parts. The embodiments are merely a part of the disclosure rather than disclosing all possible embodiments of the disclosure. More specifically, these embodiments are simply examples of the method and the apparatus recited in claims of the disclosure.

Figure 1:
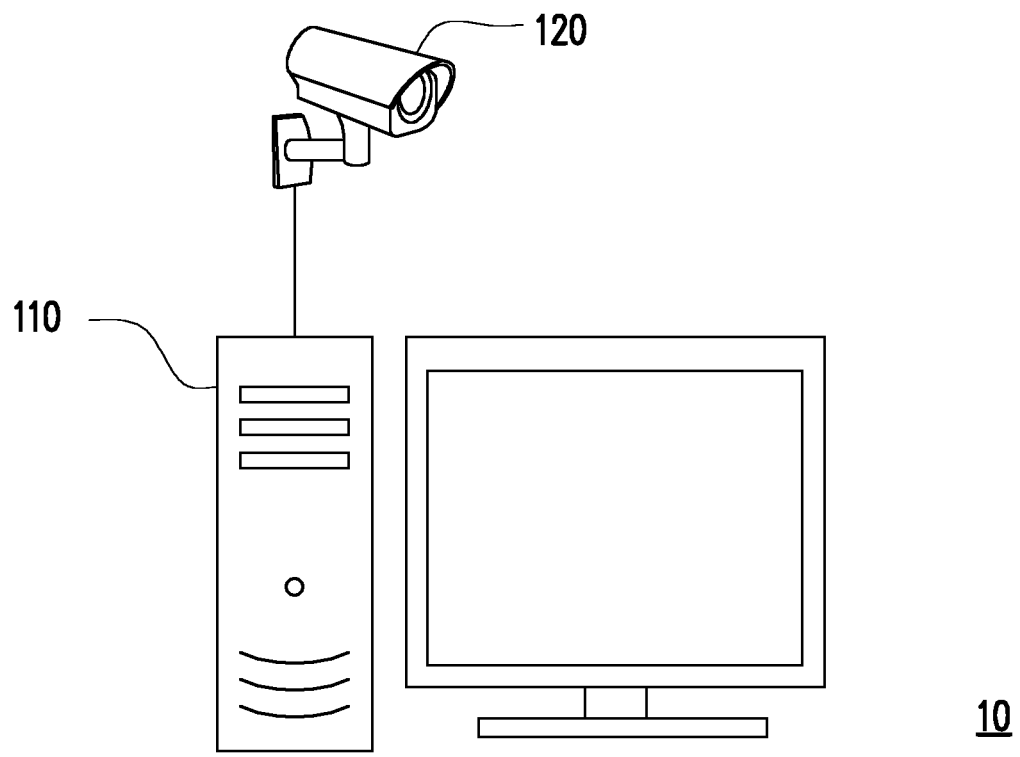
FIG. 1 is a schematic diagram of an object detection system according to an embodiment of the disclosure.

FIG. 1 is a schematic diagram of an object detection system according to an embodiment of the disclosure. Referring to FIG. 1, an object detection system 10 includes an electronic apparatus 110 and an image capturing device 120. The image capturing device 120 is configured to capture images in a space to generate a video stream including continuous images, and includes a camera lens having a lens and a photosensitive device. The photosensitive device is configured to sense an intensity of light ray entering the lens in order to generate an image. The photosensitive device may be, for example, a charge coupled device (CCD), a complementary metal-oxide semiconductor (CMOS) device or other devices, which are not particularly limited by the disclosure.

The electronic apparatus 110 is, for example, a notebook computer, a desktop computer, a server device or other computer devices with computing capability, which are not particularly limited by the disclosure. The electronic apparatus 110 can receive the video stream from the image capturing device 120 via a data transmission interface, and the video stream includes a plurality of images corresponding to continuous time points. In an embodiment, the electronic apparatus 110 may be used to perform an image processing on the images captured by the image capturing device 120, and detect a target object in the images through a deep learning model.

Figure 2:
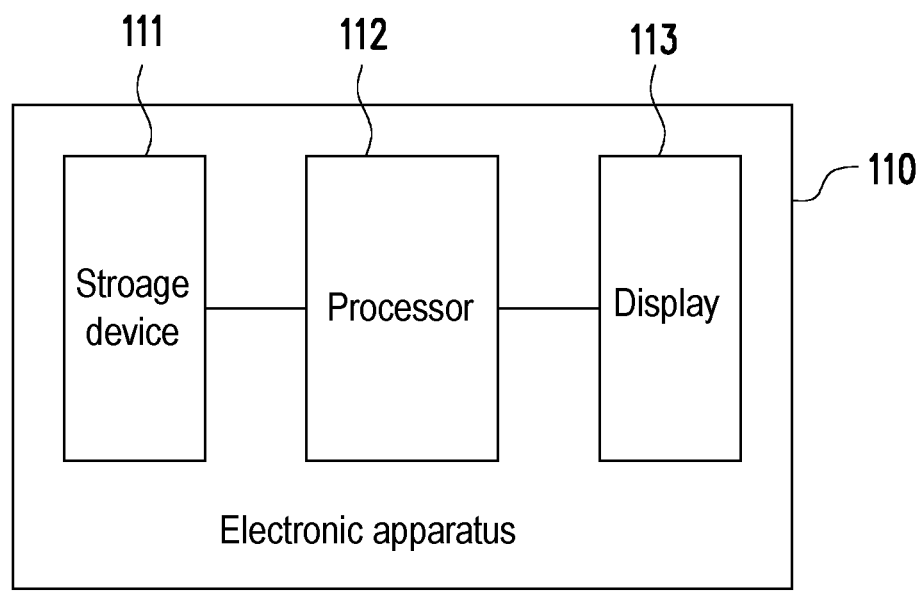
FIG. 2 is a schematic diagram of an electronic apparatus according to an embodiment of the disclosure.

FIG. 2 is a schematic diagram illustrating an electronic apparatus according to an embodiment of the disclosure. It should, however, be noted that this is merely an illustrative example and the disclosure is not limited in this regard. Referring to FIG. 2, the electronic apparatus 110 includes a storage device 111, a processor 112 and a display 113.

The storage device 111 is configured to store data including images, programming codes, software components or the like, and may be, for example, a stationary or mobile device in any form such as a random access memory (RAM), a read-only memory (ROM), a flash memory, a hard drive or other similar devices and a combination of the above.

The processor 112 is coupled to the storage device 111 and the display 113, and is, for example, a central processing unit (CPU) or other programmable devices for general purpose or special purpose such as a microprocessor and a digital signal processor (DSP), a programmable controller, an application specific integrated circuit (ASIC), a programmable logic device (PLD), a graphics processing unit (GPU), or other similar devices or a combination of above-mentioned devices. The processor 112 can execute codes, software modules, commands and the like recorded in the storage device 111 to implement the object detection method in the embodiment of the disclosure.

In this embodiment, the display 113 is, for example, a liquid crystal display (LCD), a light emitting diode (LED) display, a field emission display (FED) display, an organic light emitting diode (OLED) display or displays of other types, but not limited thereto. In an embodiment, when the target object is detected, the display 113 may be used to display image data including object information.

Figure 3:
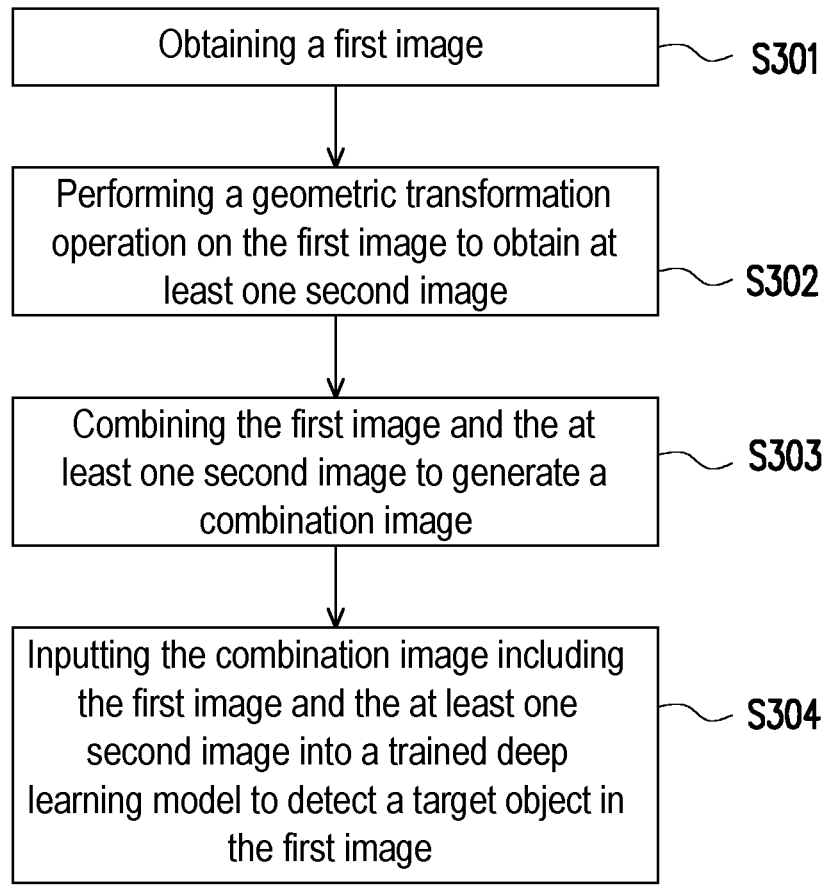
FIG. 3 is a flowchart of an object detection method according to an embodiment of the disclosure.

FIG. 3 is a flowchart of an object detection method according to an embodiment of the disclosure. Referring to FIG. 3, the method of the present embodiment is applicable to the electronic apparatus 110 in FIG. 1 and FIG. 2, and detailed steps in the method of the present embodiment will be described below with reference to each element in the electronic apparatus 110.

In step S301, the processor 112 obtains a first image. In an embodiment, the first image may be a raw image in the video stream generated by the image capturing device 120. Alternatively, in an embodiment, the first image may be generated by the processor 112 performing the image processing on the raw image in the video stream, and the image processing may be an image cropping, a de-noising process, a saturation adjustment, or a brightness adjustment. In an embodiment, the processor 112 can extract the first image from the raw image according to a region of interest (ROI). The setting of the region of interest can be used to enclose an image block (i.e., the first image) in the raw image that needs attention, and this image block can be used later to monitor the status or position of the target object in a shooting scene.

In step S302, the processor 112 performs a geometric transformation operation on the first image to obtain at least one second image. In an embodiment, the geometric transformation operation may include a rotating process, a flipping process, a translation process, a cropping process, an affine transformation, other geometric mapping transformations or a combination of the above. The number of the second images is more than one, and the number is not limited in the disclosure. For instance, the processor 112 can rotate the first image respectively according to at least one preset angle to obtain the at least one second image. Alternatively, the processor 112 can flip the first image respectively according to at least one flipping direction to obtain the at least one second image.

In addition, when the number of the second images is two or more, the corresponding geometric transformation operations of the second images may be the same or different. For instance, the processor 112 can perform the rotating process and the flipping process on the first image to generate the corresponding second images, respectively. Alternatively, when the number of the second images is two or more and the geometric transformation operations are the same, the second images are generated according to different geometric transformation parameters. For instance, the processor 112 can respectively perform the rotating process on the first image according to different rotating angles (i.e., the geometric transformation parameters) to generate the corresponding second images.

In step S303, the processor 112 combines the first image and the at least one second image to generate a combination image. In other words, the processor 112 can generate the combination image including the first image and the at least one second image. Specifically, the first image and the at least one second image are different image blocks on the combination image, and the first image and the at least one second image may be arranged on the combination image in a preset arrangement manner. The first image and the at least one second image are not overlapping with one another and are disposed on different positions on the combination image.

In step S304, the processor 112 inputs the combination image including the first image and the at least one second image into a trained deep learning model to detect a target object in the first image. Specifically, in an embodiment, the processor 112 can detect the target object in the first image by using the trained deep learning model. Here, the trained deep learning model is a neural network model constructed in advance by performing a deep learning according to a training data set, and can be stored in the storage device 111. In other words, model parameters (e.g., the number of neural network layers, weights of each neural network layer and the like) of the trained deep learning model are determined in a pre-training and stored in the storage device 111. Specifically, when the combination image is inputted into the trained deep learning model, the deep learning can perform the feature extraction to generate feature vectors, and each dimension in the feature vector is used to indicate a specific feature in the image. Then, these feature vectors are inputted into a classifier in the trained deep learning model for the classifier to classify according to the feature vectors and thereby identify the target object in the combination image. The trained deep learning model may be R-CNN, Fast R-CNN, Faster R-CNN, YOLO or SSD used for the object detection in the convolution neural network (CNN) model, which are not particularly limited by the disclosure.

It should be noted that, in application scenarios where the target object has a high variability in posture, if only the first image is inputted into the trained deep learning model, the detection failure of the trained deep learning model is likely to occur. The reason is that if the target object has the high variability in posture, the feature vector extracted according to the first image reflects the high variability in posture which cannot be correctly classified by a classification rule established in advance. Therefore, in an embodiment, the processor 112 first performs the geometric transformation operation on the first image to generate one or more second images, and then inputs the combination image generated by combining the first image and the second image into the trained deep learning model. Accordingly, since information in the combination image is richer than the first image, a success rate of the trained deep learning model for detecting the target object can be increased.

In an embodiment, the processor 112 can generate the combination image by directly combining the first image and the at least one second image. Alternatively, in an embodiment, during the process of combining the first image and the at least one second image, the processor 112 can generate the combination image by further inserting a partitioning image block between the first image and the at least one second image.

Figure 4A:
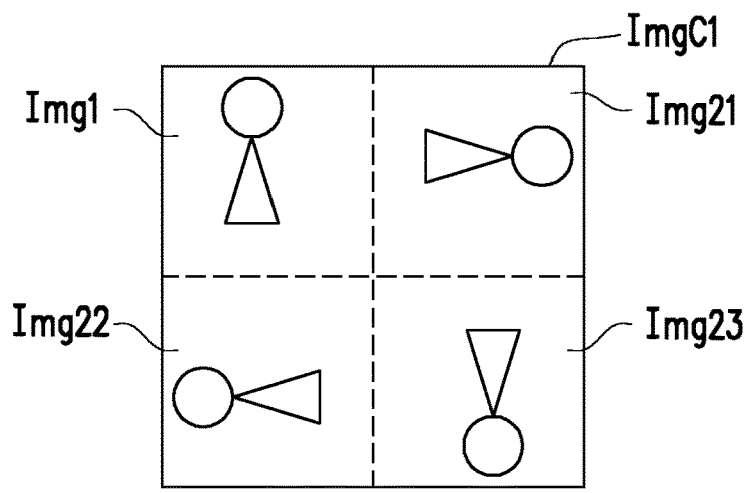
FIG. 4A to FIG. 4C illustrate examples of a combination image according to embodiments of the disclosure.
Figure 4B:
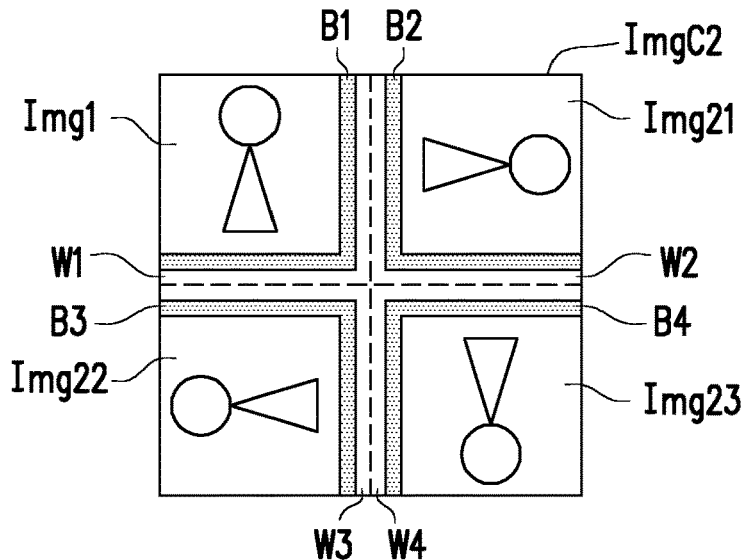
Figure 4C:
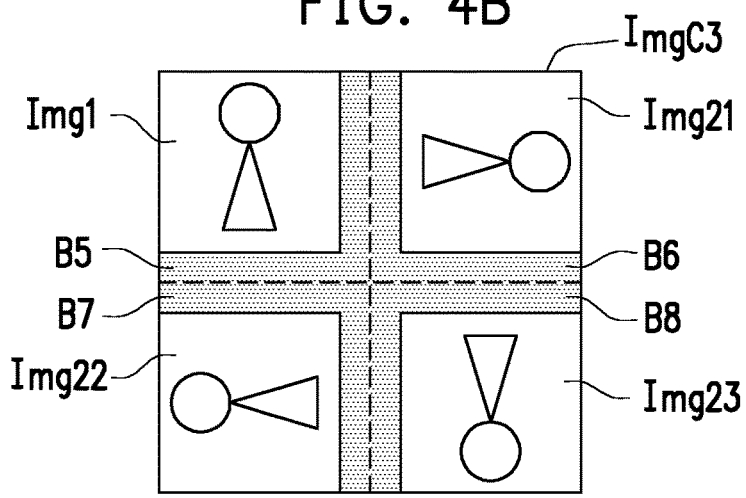

For instance, FIG. 4A to FIG. 4C illustrate examples of a combination image according to embodiments of the disclosure. In these examples, it is assumed that the geometric transformation operation is the rotating process, and the number of the second images is three. In the examples of FIG. 4A to FIG. 4C, the processor 112 rotates a first image Img1 respectively according to three preset angles to generate a first rotated image Img21, a second rotated image Img22 and a third rotated image Img23. The first image Img1, the first rotated image Img21, the second rotated image Img22 and the third rotated image Img23 are not overlapping with one another and are disposed on four different positions on the combination image. For example, the processor 112 can arrange the first image Img1, the first rotated image Img21, the second rotated image Img22 and the third rotated image Img23 in a manner of two images in a row. Referring to FIG. 4A, the processor 112 generates a combination image ImgC1 by directly combining the first image Img1, the first rotated image Img21, the second rotated image Img22 and the third rotated image Img23. The first image Img1, the first rotated image Img21, the second rotated image Img22 and the third rotated image Img23 are respectively disposed on four corners on the combination image ImgC1.

Referring to FIG. 4B and FIG. 4C, in an embodiment, the processor 112 inserts the partitioning image block between the four images to generate combination images ImgC2 and ImgC3. In the example of FIG. 4B, the partitioning image block in the combination image ImgC2 includes first color blocks B1 to B4 and second color blocks W1 to W4. For instance, the first color blocks B1 to B4 and the second color blocks W1 to W4 may be lines with a width of 10 pixels, but the disclosure is not limited thereto. It should be noted that if the first image Img1, the first rotated image Img21, the second rotated image Img22 and the rotated image Img23 are directly connected together, the deep learning model may generate incorrect object information across images because the combination image is regarded as a single image. Therefore, in an embodiment, the insertion of the separated image blocks (i.e., the first color blocks B1 to B4 and the second color blocks W1 to W4) can prevent the first image Img1, the first rotated image Img21, the second rotated image Img22 and the third rotated image Img23 from being directly connected together so the incorrect object information across images can be reduced by breaking feature links between the first image Img1, the first rotated image Img21, the second rotated image Img22, and the third rotated image Img23. In addition, considering that the captured images in the real world generally do not exist in pure black (RGB color components are 0) or pure white (RGB color components are 255), in an embodiment, a color of the first color blocks B1 to B4 may be set to black (RGB color components are 0) and a color of the second color blocks W1 to W4 may be set to black (RGB color components are 255) to improve the effect of breaking the feature links between the images. However, in other embodiments, the color of the first color block and the color of the second color blocks may be other colors, such as dark gray close to black or light gray close to white, and so on.

In the example of FIG. 4C, the partitioning image block in the combination image ImgC3 includes first color blocks B5 to B8. For instance, the first color blocks B5 to B8 may be lines with a width of 20 pixels, but the disclosure is not limited thereto. Considering that the white pixels may be regarded as the background of the image, in an embodiment, the partitioning image blocks may all be composed of black blocks. In other words, in the example of FIG. 4C, the first image Img1, the first rotated image Img21, the second rotated image Img22, and the third rotated image Img23 are connected by the black pixels in the partitioning image block, so that not only the effect of breaking the feature link between the images can be improved, the success rate of the deep learning model for detecting may also be improved. Nonetheless, the above examples of FIG. 4B and FIG. 4C are not intended to limit the disclosure. In other embodiments, the partitioning image block may include more color blocks or may be implemented by other patterns.

Figure 5:
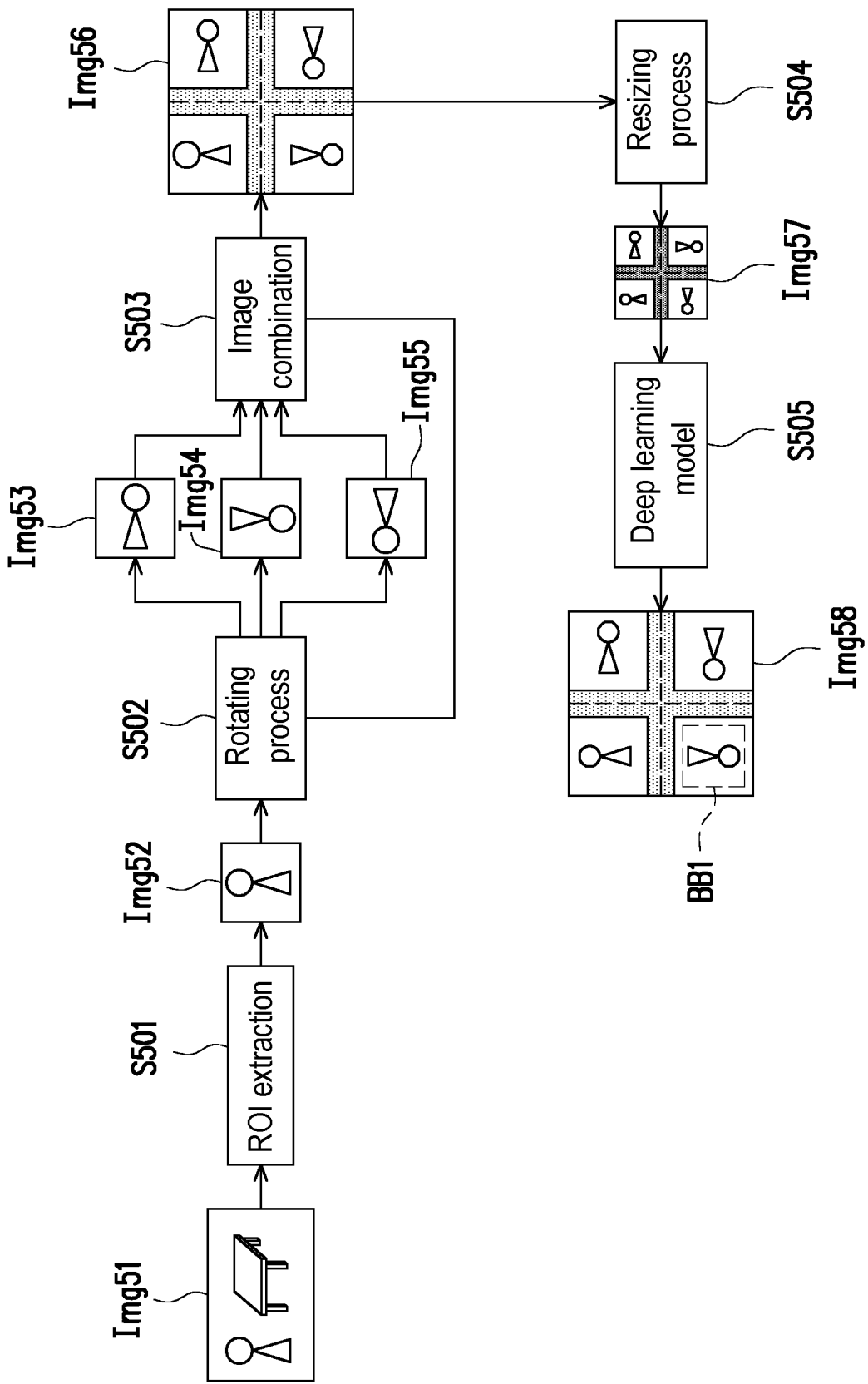
FIG. 5 is a flowchart of an object detection method according to an embodiment of the disclosure.

FIG. 5 is a flowchart of an object detection method according to an embodiment of the disclosure. The method of the present embodiment is applicable to the electronic apparatus 110 in FIG. 1 and FIG. 2, and detailed steps in the method of the present embodiment are described below with the reference to each element in the electronic apparatus 110.

Referring to FIG. 5, in step S501, the processor 112 obtains a raw image Img51 from a video stream, and extracts a first image Img52 from the raw image Img51 according to a region of interest. In step S502, the processor 112 rotates the first image Img52 respectively according to reset angles 90 degrees, 180 degrees and 270 degrees to obtain three second images Img53 to Img55. Nonetheless, the configuration of the preset angles may be set according to actual applications, and the disclosure is not limited thereto. In step S503, the processor 112 combines the first image Img51 and the second images Img53 to Img55 to generate a combination image Img56. It should be noted that the processor 112 can, for example, insert the partitioning image block between the first image Img51 and the second images Img53 to Img55 according to the manner shown by FIG. 4C.

In step S504, the processor 112 adjusts an image dimension of the combination image Img56. In an embodiment, the processor 112 can adjust the image dimension of the combination image by performing a resizing process and/or filling in with a blank image block. More specifically, the image dimension of the combination image increases due to the increasing number of second images and the insertion of the partitioning image block. Therefore, the processor 112 needs to shrink the combination image so it can meet the image dimension required by the deep learning model. In addition, if a ratio of the image dimension required by the deep learning model is different from a ratio of the image dimension of the combination image, the processor 112 can first shrink the combination image by equal proportions and then fill in with the blank image block, so that the image dimension of the combination image can be adjusted to match the requirement of the deep learning model. In other words, in the process of adjusting the image dimension of the combination image, the first image and the second image in the combination image are proportionally resized to prevent the deep learning model from performing the object detection based on distorted image data.

For instance, in the example of FIG. 4C, if the image dimension of the first image is 450*450 (pixels), the image dimension of each of the first rotated image Img21, the second rotated image Img22, and the third rotated image Img23 in the second image also needs to be 450*450 (pixels). In addition, the first color blocks B5 to B8 are black lines each having a width of 20 pixels. In this case, an image dimension of the combination image ImgC3 is 940*940. If the image dimension required by the deep learning model is 450*450, the processor 112 needs to shrink the combination image ImgC3 from 940*940 to 450*450. On the other hand, if the image dimension required by the deep learning model is 640*480, the processor 112 can shrink the combination image ImgC3 from 940*940 to 480*480 and then fill in with a blank image block of 160*480 to generate the combination image of 640*480.

Figure 6A:
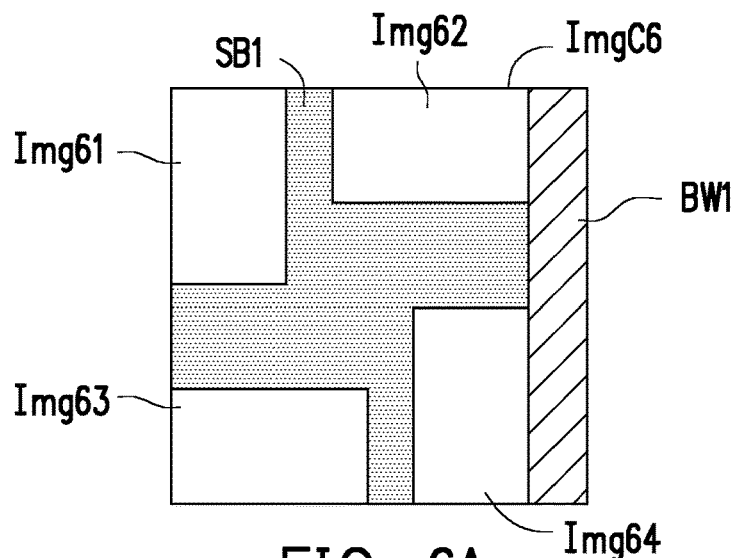
FIG. 6A to FIG. 6C illustrate examples of a combination image according to embodiments of the disclosure.
Figure 6B:
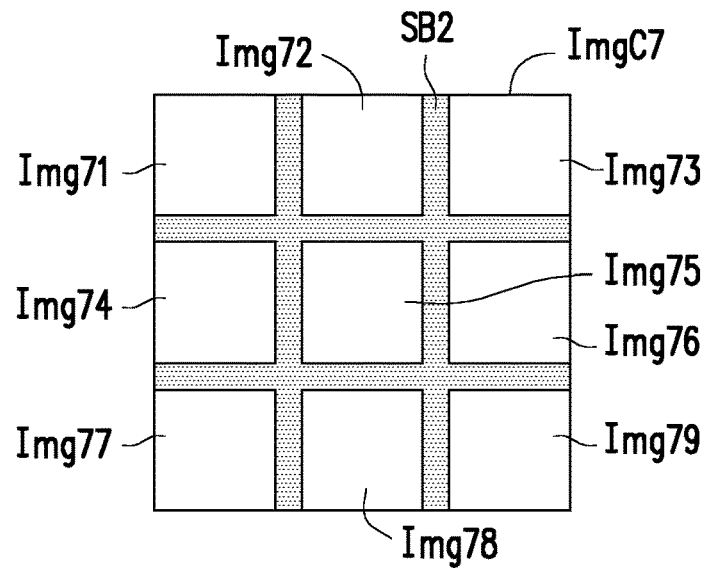
Figure 6C:
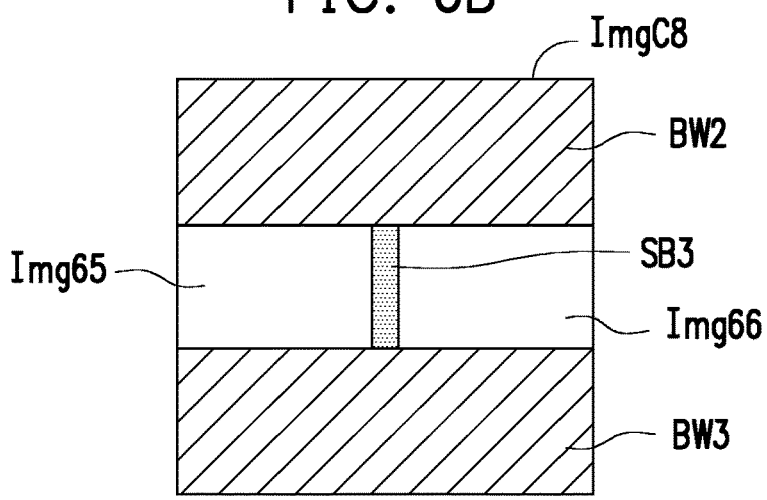

Other methods for configuring the combination image are provided as follow. FIG. 6A to FIG. 6C illustrate examples of a combination image according to embodiments of the disclosure. Referring to FIG. 6A, in this example, if a first image Img61 is a rectangular image block, a combination image ImgC6 can include the first image Img61, rotated second images Img62 to Img64, a partitioning image block SB1 and a blank image block BW1. Here, a dimension of the blank image block BW1 depends on an image dimension of the first image Img61 and an image dimension required by the deep learning model.

Referring to FIG. 6B, in this example, if the processor 112 performs a rotating operation on a first image mg71 eight times to obtain rotated second images Img72 to Img79 and the first image Img71 and the second images Img72 to Img79 are arranged in a manner of three images in a row, a combination image ImgC7 can include the first image Img71, the rotated second images Img72 to Img79 and a partitioning image block SB2. It should be noted that as the number of second images in the combination image increases, the resized combination image may have loss of image features. That is, due to the large number of images, the first image and the second images in the combination image will shrink the images even further to cause the loss of image features that affects the success rate of the deep learning model for detecting.

Referring to FIG. 6C, in this example, if the processor 112 performs a rotating operation on a first image Img65 once to obtain a rotated second image Img66 and the first image Img65 and the second image Img66 are arranged in a manner of two images in a row, a combination image ImgC8 can include the first image Img65, the rotated second image Img66, a partitioning image block SB3 and blank image blocks BW2 and BW3. Here, dimensions of the blank image blocks BW2 and BW3 depend on an image dimension of the first image Img61 and an image dimension required by the deep learning model. It should be noted that, in such an arrangement manner, the blank image blocks BW2 to BW3 that do not carry any information have a wider coverage area.

Considering the potential problems that the arrangement manner of FIG. 6B and FIG. 6C may cause, in an embodiment, it is an ideal arrangement that the combination image includes one first image and three second images arranged in a manner of two images in a row (the arrangement manner as shown in FIG. 5) This arrangement manner can reduce the coverage area of the blank image blocks that do not carry information without excessively shrinking the image and losing too many image features. Accordingly, accuracy of the deep learning model can be effectively improved.

Returning to the flow of FIG. 5, in step S505, the processor 112 inputs a combination image Img57 into the trained deep learning model to detect a target object. In an embodiment, when the target object is detected, the processor 112 can display a combination image Img58 including object information by the display 113, and the object information includes a bonding box BB1 used to enclose the detected target object.

Figure 7:
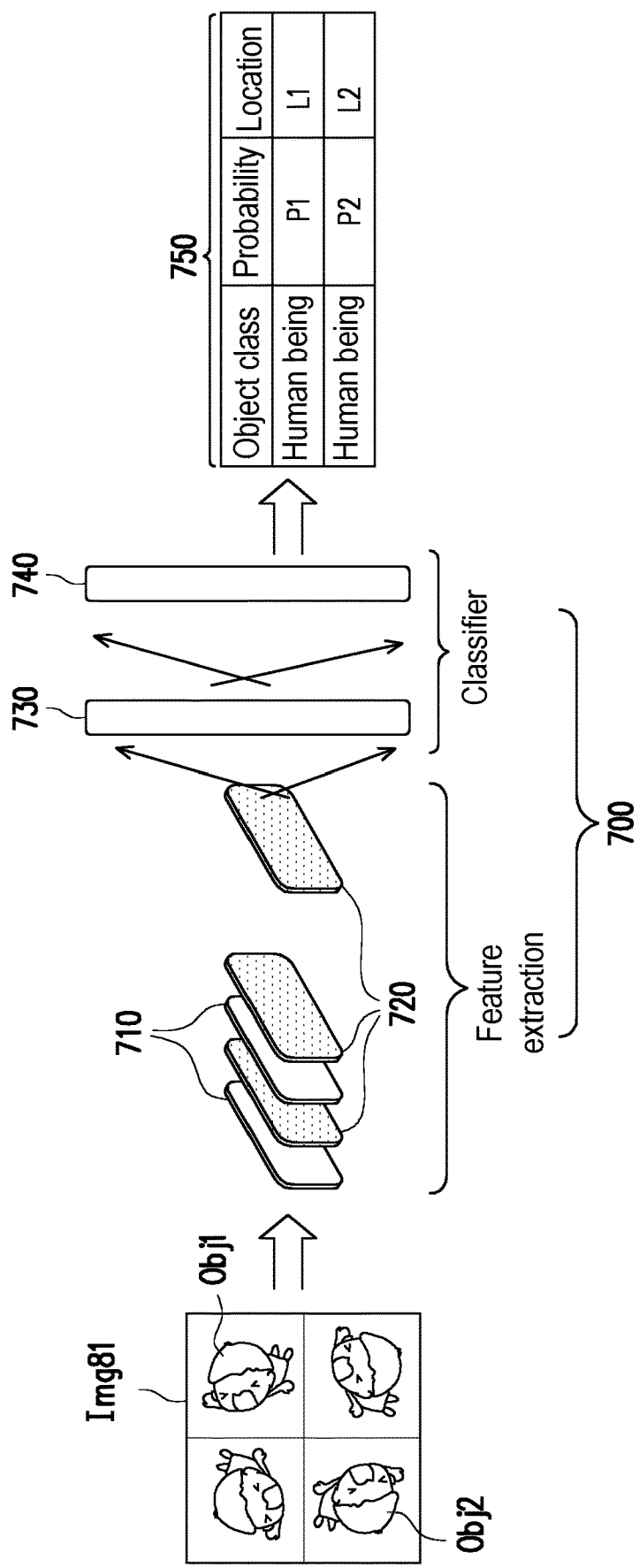
FIG. 7 is a schematic diagram of detecting an object based on a deep learning model according to an embodiment of the disclosure.

FIG. 7 is a schematic diagram of detecting an object based on a deep learning model according to an embodiment of the disclosure. Referring to FIG. 7, the deep learning model may be the CNN model, and the following describes the input of the combination image Img81 to the CNN model as an example. In this example, a convolution layer neural network 700 is composed of at least one convolution layer 710, at least one pooling layer 720, at least one fully connected layer 730, and an output layer 740.

A front section of the convolution layer neural network 700 is usually composed of the convolution layer 710 and the pooling layer 720 connected in series, and is generally used as the feature extraction of images for obtaining feature values of the combination image Img81. This feature value may be a multi-dimensional array, which is generally regarded as the feature vector of the inputted combination image Img81. A rear section of the convolution layer neural network 700 includes the fully connected layer 730 and the output layer 740. The fully connected layer 730 and the output layer 740 can classify objects in the combination image Img81 according to the feature values generated through the convolution layer 710 and the pooling layer 720, and can then obtain object information 750. The object information 750 may include object classes, object locations, and object classification probabilities. In the example of FIG. 7, the processor 112 can detect two target objects Obj1 and Obj2 classified as "Human being" from the combination image Img81 through the convolution layer neural network 700. These two target objects Obj1 and Obj2 correspond to object locations L1 and L2 and object classification probabilities P1 and P1, respectively. The object locations L1 and L2 may include coordinate information of the bonding box. Accordingly, the processor 112 can determine that the human being is detected, and can execute other subsequent applications according to the object locations L1 or L2.

Figure 8:
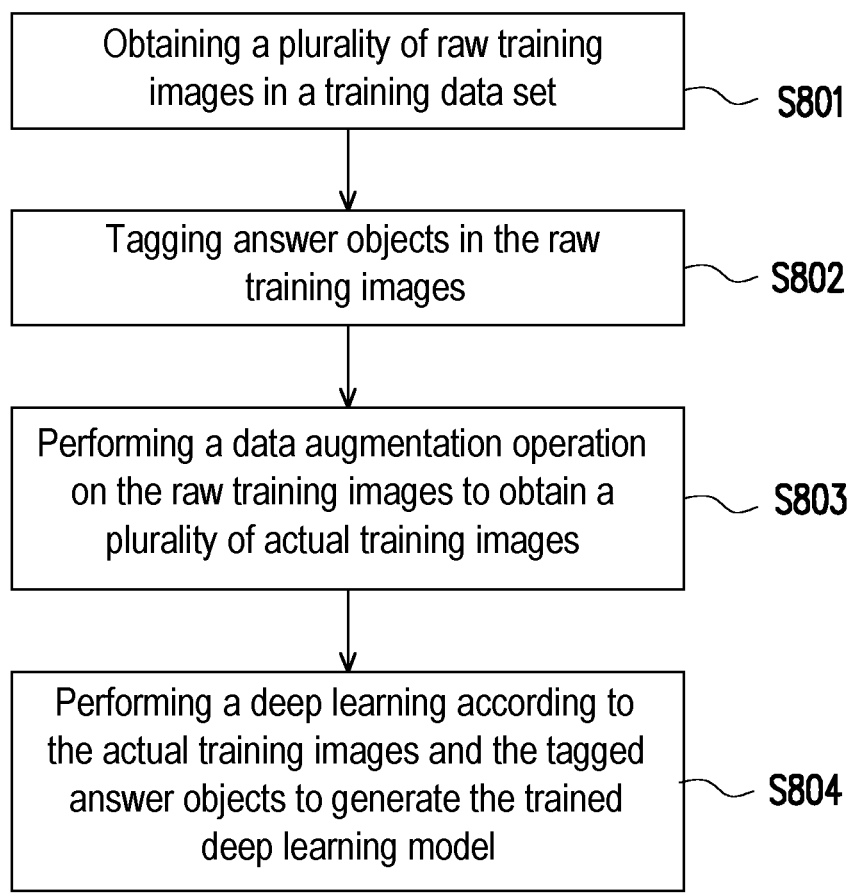
FIG. 8 is a flowchart of training a deep learning model according to an embodiment of the present disclosure.

FIG. 8 is a flowchart of training a deep learning model according to an embodiment of the present disclosure. Referring to FIG. 8, the method of the present embodiment is applicable to the electronic apparatus 110 in FIG. 1 and FIG. 2, and detailed steps in the method of the present embodiment will be described below with reference to each element in the electronic apparatus 110.

In step S801, the processor 112 obtains a plurality of raw training images in a training data set. In step S802, the processor 112 tags answer objects in the raw training images. In other words, the answer objects in these original training images are selected and assigned with an answer class. In step S803, the processor 112 performs a data augmentation operation on the raw training images to obtain a plurality of actual training images. The data augmentation operation is a way to increase the training data set, which is mainly achieved by modifying the raw training images. For instance, the processor 112 may perform the translation process, the flipping process, the rotating process and the like on the raw training images to generate the actual training images with a larger amount of data.

Then, in step S804, the processor 112 performs a deep learning according to the actual training images and the tagged answer objects to generate the trained deep learning model. Specifically, the processor 112 can input the actual training images into the deep learning model. By comparing an output of the deep learning model with object information of the answer objects, the processor 112 can gradually train a set of rules for the object detection (i.e., the weights of the deep learning model), and eventually establish the deep learning model capable of detecting the target object.

It should be noted that based on the embodiments shown in FIG. 3 and FIG. 5, the processor 112 detects the target object by inputting the combination image including the first image and the second image into the trained deep learning model. However, during the process of establishing the trained deep learning model by performing the deep learning according to the training data set, the processor 112 does not perform similar image combination operations. Instead, the processor 112 performs the deep learning by inputting the actual training images to the deep learning model one by one. Although the above-mentioned actual training images can be generated through the data augmentation operation, the data augmentation operation used to process the training data is independent of the geometric transformation operation during actual detection. In other words, the data augmentation operation is not related to the geometric transformation operation for generating the combination image.

In summary, in the embodiments of the disclosure, after the combination image is generated based on the geometric transformation operation, the target object can be detected by inputting the combination image into the deep learning model. Here, because the combination image includes more information, the success rate and efficiency of the deep learning model in detecting the target object can be improved in scenes where the posture of the target object changes greatly. In this way, repeated training of the deep learning model can be avoided, and the probability that the deep learning model is difficult to converge during the training process can be reduced.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An object detection method, adapted to an electronic apparatus, and the method comprises:
    obtaining a first image, wherein the first image is an image to be detected;
    performing a geometric transformation operation on the first image to obtain at least one second image;
    combining the first image and the at least one second image to generate a combination image; and
    inputting the combination image including the first image and the at least one second image into a trained deep learning model to detect a target object in the first image.

2. The object detection method according to claim 1, wherein the step of performing the geometric transformation operation on the first image to obtain the at least one second image comprises:
    rotating the first image respectively according to at least one preset angle to obtain the at least one second image.

3. The object detection method according to claim 2, wherein the at least one second image comprises a first rotated image, a second rotated image and a third rotated image, and the first image, the first rotated image, the second rotated image and the third rotated image are not overlapping with one another and are disposed on four different positions on the combination image.

4. The object detection method according to claim 1, wherein the step of combining the first image and the at least one second image to generate the combination image comprises:
    inserting a partitioning image block between the first image and the at least one second image; and
    adjusting an image dimension of the combination image.

5. The object detection method according to claim 4, wherein the partitioning image block comprises a first color block, a second color block or a combination thereof.

6. The object detection method according to claim 5, wherein the first color block is a black block.

7. The object detection method according to claim 1, the method further comprising:
    obtaining a raw image from a video stream; and
    extracting the first image from the raw image according to a region of interest.

8. The object detection method according to claim 1, the method further comprising:
    displaying, by a display, the combination image including object information, wherein the object information comprises a bonding box used to enclose the detected target object.

9. The object detection method according to claim 1, the method further comprising:
    obtaining a plurality of raw training images in a training data set;
    tagging answer objects in the raw training images;
    performing a data augmentation operation on the raw training images to obtain a plurality of actual training images; and
    performing a deep learning according to the actual training images and the tagged answer objects to generate the trained deep learning model, wherein the data augmentation operation is independent of the geometric transformation operation.

10. The object detection method according to claim 1, wherein the deep learning model is a convolution neural network (CNN) model.

11. An electronic apparatus, comprising:
    a storage device; and
    a processor, coupled to the storage device, and configured to execute commands stored in the storage device to:
        obtain a first image, wherein the first image is an image to be detected;
        perform a geometric transformation operation on the first image to obtain at least one second image;
        combine the first image and the at least one second image to generate a combination image; and
        input the combination image including the first image and the at least one second image into a trained deep learning model to detect a target object ill the first image.

12. The electronic apparatus according to claim 11, wherein the processor is further configured to:
    rotate the first image respectively according to at least one preset angle to obtain the at least one second image.

13. The electronic apparatus according to claim 12, wherein the at least one second image comprises a first rotated image, a second rotated image and a third rotated image, and the first image, the first rotated image, the second rotated image and the third rotated image are not overlapping with one another and are disposed on four different positions on the combination image.

14. The electronic apparatus according to claim 11, wherein the processor is further configured to:

insert a partitioning image block between the first image and the at least one second image; and adjust an image dimension of the combination image.

15. The electronic apparatus according to claim 14, wherein the partitioning image block comprises a first color block, a second color block or a combination thereof.

16. The electronic apparatus according to claim 15, wherein the first color block is a black block.

17. The electronic apparatus according to claim 11, wherein the processor is configured to:

obtain a raw image from a video stream; and extract the first image from the raw image according to a region of interest.

18. The electronic apparatus according to claim 11, wherein the electronic apparatus further comprises: a display, displaying the combination image including object information, wherein the object information comprises a bonding box used to enclose the detected target object.

19. The electronic apparatus according to claim 11, wherein the processor is configured to:

obtain a plurality of raw training images in a training data set;

tag answer objects in the raw training images;

perform a data augmentation operation on the raw training images to obtain a plurality of actual training images; and perform a deep learning according to the actual training images and the tagged answer objects to generate the trained deep learning model, wherein the data augmentation operation is independent of the geometric transformation operation.

20. An object detection system, comprising:

an image capturing device, configured to capture images; and an electronic apparatus, connected to the image capturing device, and comprising:

a storage device; and a processor, coupled to the storage device, and configured to execute commands stored in the storage device to:

obtain a first image, wherein the first image is an image to be detected;

perform a geometric transformation operation on the first image to obtain at least one second image;

combine the first image and the at least one second image to generate a combination image; and input the combination image including the first image and the at least one second image into a trained deep learning model to detect a target object in the first image, wherein the processor is further configured to:

rotate the first image respectively according to at least one preset angle to obtain the at least one second image, wherein the at least one second image comprises a first rotated image, a second rotated image and a third rotated image, and the first image, the first rotated image, the second rotated image and the third rotated image are disposed on four corners on the combination image.

* * * * *